United States Patent [19]
Burbridge et al.

[11] Patent Number: 5,913,494
[45] Date of Patent: Jun. 22, 1999

[54] BLADE SEAL FOR AN AIRCRAFT

[75] Inventors: Thomas Edward Burbridge, Florissant; Harvey John Tomko, St. Peters; Robert Henry Wille, St. Charles, all of Mo.

[73] Assignee: McDonnell Douglas

[21] Appl. No.: 08/900,634

[22] Filed: Jul. 25, 1997

[51] Int. Cl.⁶ ................. B64C 3/58; B64C 1/38; F16J 15/00
[52] U.S. Cl. ............ 244/213; 244/130; 277/651; 277/652; 277/644
[58] Field of Search ............... 244/213, 214, 244/215, 219, 130; 277/651, 652, 644, 640

[56] References Cited

U.S. PATENT DOCUMENTS

| | | | |
|---|---|---|---|
| 4,471,925 | 9/1984 | Kunz | 244/215 |
| 5,222,699 | 6/1993 | Albach et al. | 244/213 |
| 5,794,893 | 8/1998 | Diller et al. | 244/213 |
| 5,839,698 | 11/1998 | Moppert | 244/214 |

Primary Examiner—Charles T. Jordan
Assistant Examiner—Theresa M. Wesson
Attorney, Agent, or Firm—Dale B. Halling

[57] ABSTRACT

A blade seal (20) for an aircraft has a mounting structure (22). A composite blade (26) is attached to the mounting structure (22). The composite blade (26) has a plurality of holes (28). An elastomer substance (30) is used to fill the plurality of holes (28).

17 Claims, 1 Drawing Sheet

BLADE SEAL FOR AN AIRCRAFT

FIELD OF THE INVENTION

The present invention relates generally to the field of aircraft and more particularly to a blade seal for an aircraft.

BACKGROUND OF THE INVENTION

All aircraft employ control surfaces on the wings, tail or fuselage. These control surfaces take the form of ailerons, leading edge flaps, rudders, elevators and others. These control surfaces are pivoted to provide a control moment. Gaps form between the control surface and the aircraft, when the control surface is pivoted. These gaps allow aerodynamic spillage reducing the effectiveness of the control surface. Present aircraft use preformed composite blade seals, that are placed over the hingeline edge of the control surface to reduce the aerodynamic spillage. The blade seals are preformed to have sufficient preload to keep against the control surfaces during flight operations. As the control surface is pivoted against the composite blade seal, the seal is bent to conform to the control surface. Unfortunately, present blade seals can be very stiff requiring significant actuation force by the control surface to bend. This problem is particularly acute where the moldline of the aircraft curves in the area of the hingeline.

Thus there exists a need for a blade seal that does not require a large actuation force to bend.

SUMMARY OF THE INVENTION

A blade seal for an aircraft that overcomes these and other problems has a mounting structure. A composite blade is attached to the mounting structure. The composite blade has a plurality of holes. An elastomer substance is used to fill the plurality of holes.

DETAILED DESCRIPTION OF THE DRAWINGS

Figure 1:
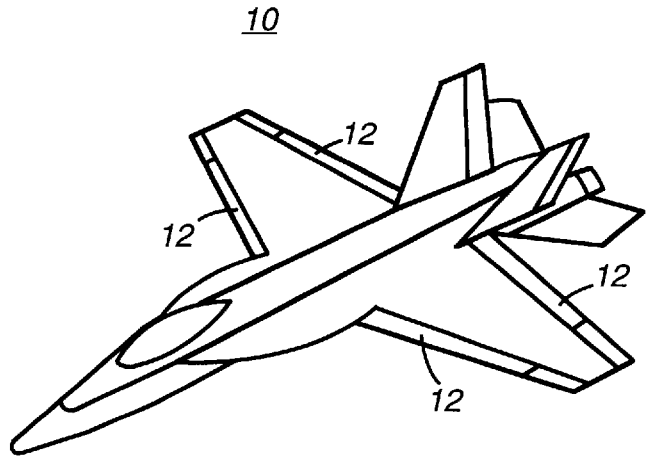
FIG. 1 is a perspective view of an aircraft.
Figure 2:
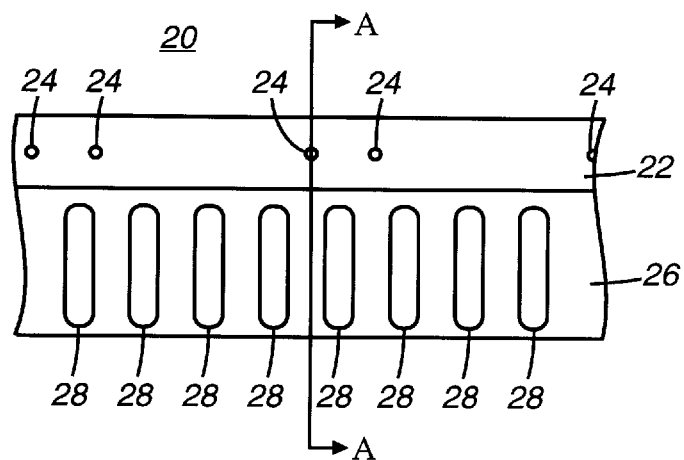
FIG. 2 is a top view of a blade seal for an aircraft according to the invention.

An aircraft 10 is shown in FIG. 1. The aircraft 10 has a number of control surfaces 12 that require blade seals. A blade seal 20 according to the invention is shown in FIG. 2. The blade seal 20 has a mounting structure 22. The mounting structure 22 has a plurality of attachment provisions 24. A composite blade (flexible wedge blade, flexible webbed blade) 26 extends out from the mounting structure 22. The blade 26 covers the hingeline of the control surface. The composite blade 26 has a plurality of holes (plurality of gaps) 28 that in one embodiment are strips extending perpendicularly from the mounting structure 22. An elastomer substance (elastomer material) 30 is used to fill in the plurality of holes 28.

Figure 3:
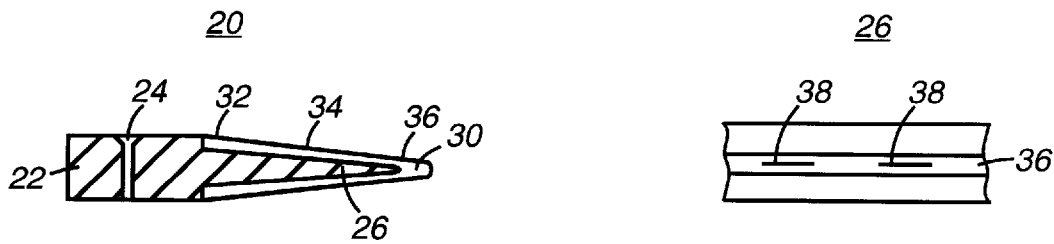
FIG. 3 is a cross sectional view of the blade seal of FIG. 2 taken along the A—A line.

In one embodiment the elastomer substance 30 encases the blade 26 (See FIG. 3). The composite blade 26 has a wedge shape, where the thick edge 32 is adjacent to the mounting structure 22. In one embodiment the mounting structure 22 and the blade 26 are form out of a composite. A flexible elastic material (stretchable covering) 34 encases the flexible blade 26. In one embodiment, the flexible elastic material 34 is a metalized knit fabric. In one embodiment, the metalized knit fabric is a warp knit of fabric made from polyamide nylon fibers. In addition, the fabric may contain a small amount of elastic polyurethane fiber. Typically an environmental coating is the applied over the fabric. The environmental coating is an elastomeric coating, which can be in the form of fluorosilicones, fluoroelastomers, silicones, thermoplastic elastomers, urethanes or other viable elastic materials.

Figure 4:
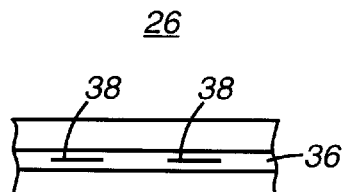
FIG. 4 is an end view of an embodiment of the blade seal.

FIG. 4 is an end view of another embodiment of the flexible blade 26. The tip (shown in white) 36 has a plurality of orifices 38. The orifices 38 extend from the tip (thin edge) 36 to the plurality of holes 28. The orifices are also filled with an elastomer substance. The blade seal shown in FIGS. 2–4 requires significantly less actuation force than previous designs. One of the reasons for the lower actuation force is the wedge shape of the flexible blade 26. The wedge shape causes the tip to require less actuation force for the same displacement than nearer the base 32. As a result, the portion of the blade being displaced the farthest requires the least actuation force. A second reason for the lower actuation force is the plurality of holes 28 or webbed design of the blade 26. The plurality of holes 28 reduce the force required for deflection due to the removal of material. The elastomer 30 filling the holes is significantly less stiff than the surrounding blade 26 and does not transmit the force. Another advantage of the holes 28 is to allow twisting of the blade when the aircraft moldline is curved along the hingeline of the control surface. Under this circumstance the blade 20 has to both deflect and twist. The holes 28 provide stress relieving sections that allow the stress caused by twisting to be relieved by the holes 28. Since the elastomer material filling the holes 28 is significantly less stiff than the composite blade 26, it does not transmit the stress of the twisting. In the embodiment with the orifices 28, the stress of twisting is further relieved by the slits (plurality of slots) 38.

Thus there has been described a blade seal for an aircraft that significantly reduces the actuation force necessary to bend the blade seal when a control surface is actuated. While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A blade seal for an aircraft comprising:

a mounting structure;

a composite blade attached to the mounting structure, the composite blade having a plurality of holes; and an elastomer substance filling the plurality of holes.

2. The blade seal of claim 1, wherein the mounting structure is made from a composite.

3. The blade seal of claim 1, wherein the plurality of holes are strips.

4. The blade seal of claim 3, wherein the strips run perpendicular to the mounting structure.

5. The blade seal of claim 1, wherein the mounting structure is attached to the aircraft adjacent to a control surface.

6. The blade seal of claim 1, wherein the composite blade had a wedge shape.

7. The blade seal of claim 6, wherein a thick edge of the wedge shape is adjacent to the mounting structure.

8. The blade seal of claim 7, further including an orifice extending from a thin edge to one of the plurality of holes.

9. The blade seal of claim 1, further including a stretchable covering encasing the composite blade.

10. The blade seal of claim 1, wherein the elastomer substance encases the composite blade.

11. A blade seal for an aircraft, comprising:

an attachment structure;

a flexible wedge blade extending from the attachment structure, the flexible wedge blade having a plurality of gaps; and an elastomer material covering the flexible wedge blade.

12. The blade seal of claim 11, further including a stretchable covering encasing the elastomer material.

13. The blade seal of claim 11, further including a plurality of slots, each of the plurality of slots extending from a tip of the flexible wedge blade to each of the plurality of gaps.

14. The blade seal of claim 11, wherein the flexible wedge blade is made from a composite.

15. A blade seal for an aircraft, comprising:

a mounting structure;

a flexible webbed blade extending from the mounting structure; and an elastomer substance covering the flexible webbed blade.

16. The blade seal of claim 15, further including a flexible covering over the elastomer substance.

17. The blade seal of claim 15, further including a slot extending into a tip of the flexible webbed blade.

* * * * *